Nov. 16, 1943.  C. D. HAVEN ET AL  2,334,624
APPARATUS FOR USE IN THE FABRICATION OF MULTI-PLY
GLASS SHEET GLAZING UNITS
Original Filed Aug. 8, 1938   5 Sheets-Sheet 2

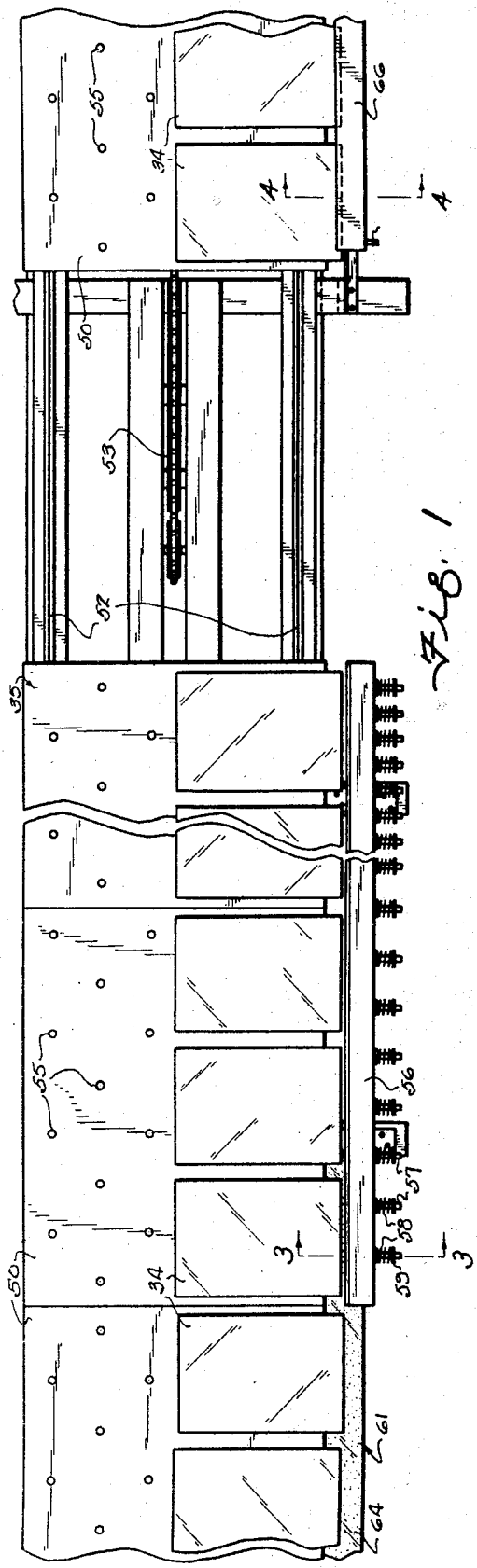

Inventors
CHARLES D. HAVEN,
JOHN J. HOPFIELD.
Frank Fraser
Attorney

Nov. 16, 1943. C. D. HAVEN ET AL 2,334,624
APPARATUS FOR USE IN THE FABRICATION OF MULTI-PLY
GLASS SHEET GLAZING UNITS
Original Filed Aug. 8, 1938 5 Sheets-Sheet 3

Inventors
CHARLES D. HAVEN.
JOHN J. HOPFIELD.

By Frank Fraser
Attorney

Patented Nov. 16, 1943

2,334,624

UNITED STATES PATENT OFFICE 2,334,624

APPARATUS FOR USE IN THE FABRICATION OF MULTIPLY GLASS SHEET GLAZING UNITS

Charles D. Haven and John J. Hopfield, Toledo, Ohio, assignors to Libbey-Owens-Ford Glass Company, Toledo, Ohio, a corporation of Ohio Original application August 8, 1938, Serial No. 223,635. Divided and this application November 9, 1940, Serial No. 365,132

12 Claims. (Cl. 91—12.2)

The present invention relates broadly to coating apparatus and more particularly to an apparatus for metallizing the marginal portions of glass sheets, constituting a division of our copending application filed August 8, 1938, Serial No. 223,635, now Patent No. 2,235,681 dated March 18, 1941.

According to the invention, glass sheets, after proper cleaning, are provided with metallic coatings around their border portions on one or both surfaces thereof, and our structure embodies certain novel combinations, steps of processing, apparatus for carrying out such steps, and details of construction which we consider important to the production of a truly satisfactory and permanent form of metallized coating wherein the glass and metal are adequately bonded together in such a way that alternate expansion and contraction of the component parts or changes in atmospheric conditions will not result in its failure.

Other objects and advantages of the invention will become more apparent during the course of the following description when taken in connection with the accompanying drawings.

In the drawings, wherein like numerals are employed to designate like parts throughout the same:

Fig. 1 is a fragmentary plan view of one form of apparatus which can be employed in the application of a metallic coating along the border portions of the glass sheets;

Fig. 2 is a similar view showing a continuation of the apparatus disclosed in Fig. 1;

The coatings on the glass sheets may be produced from pure copper or an alloy of copper, as it has been found that pure copper and some of its alloys can be sprayed upon the glass very satisfactorily and also weathers well in use. It is important, however, that the temperature of the glass be properly controlled at the time the metal is applied thereto. Bronze may be used in lieu of copper and of course other satisfactory metal or metal alloys or multiple coats of different metals can also be substituted for the copper coatings. The surfaces of the glass sheets should be thoroughly cleaned to facilitate application of the metal coatings upon the glass in a manner to get permanent and adequate adhesion or bond between the glass and metal.

Figure 5:
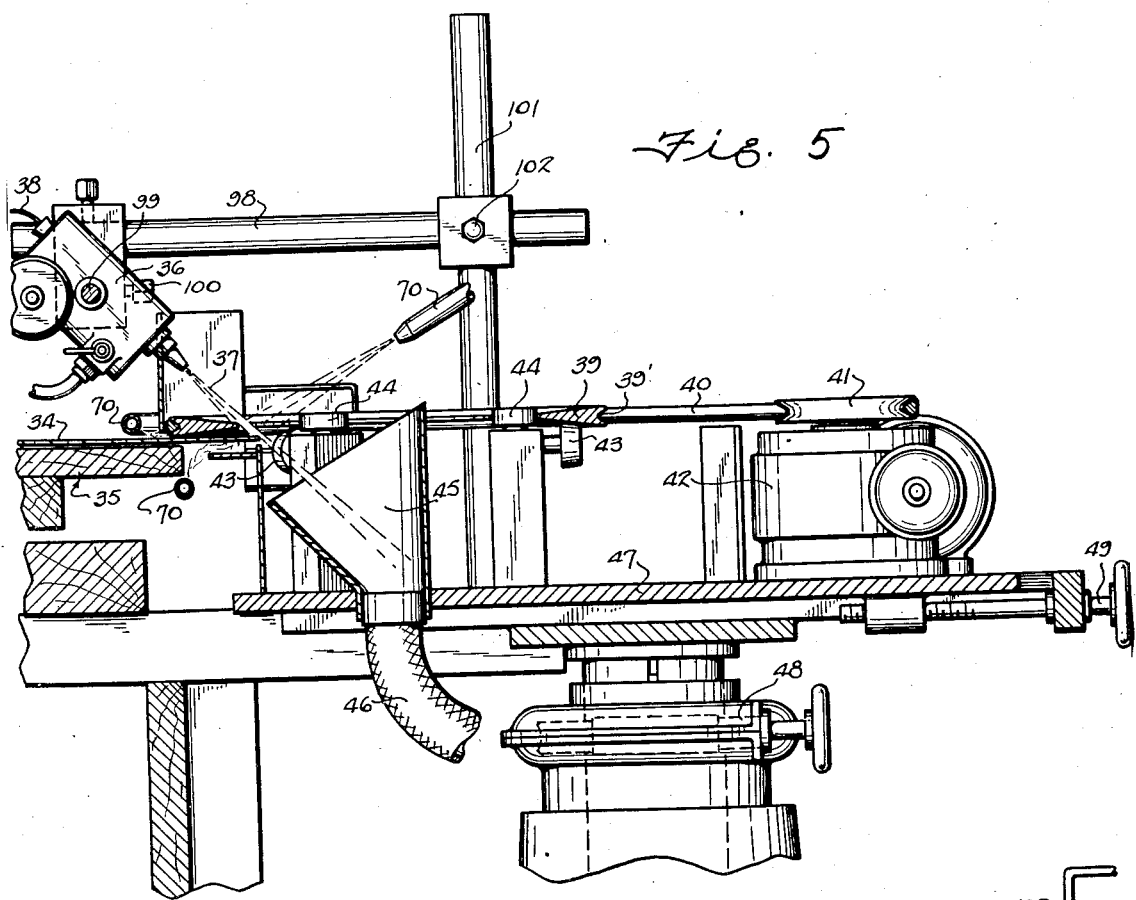
Fig. 5 is a vertical transverse sectional view of a portion of the apparatus taken on line 5—5 in Fig. 2.

In Figs. 5 is illustrated that portion of our assembly table where the copper, copper alloy, or other metal substance is applied to the marginal portions of the glass sheets. As shown, the glass sheet 34 rests upon and is carried by the conveyor 35. Disposed above the conveyor 35 is a metallizing gun 36 which may be of any construction capable of producing a spray of metal 37 which can be directed upon the pre-selected edge portions of the glass sheets moving thereunder. We have found that very satisfactory results can be obtained when using a spray gun in which a metal wire 38 is fed into the gun, melted, and sprayed in fine particles upon the glass. The deposit of metal upon the glass is not only controlled by the relative position of the gun with respect to the glass, speed of the wire through the gun, and speed of movement of the glass, but also by a guard member 39 designed for this particular purpose.

The guard member 39 comprises a horizontal annular ring member substantially V-shaped in cross section, with the thin edge thereof disposed inwardly and terminating short of the edge of the glass sheets to be coated, as is clearly shown in Fig. 5. The guard member is also provided around its outer edge with a groove 39' adapted to receive a belt 40 driven by a pulley 41 operated from motor 42. The guard member 39 is supported on rollers 43 and held in proper position by guide rollers 44 engaging the inner edge thereof. The guard member 39 rotates rather slowly and serves as a mask or shield for controlling the width of the sprayed metallic coatings or ribbons 30 upon the glass.

The width of the metallic coatings so formed is dependent upon the relative position of the guard member with respect to the sheet edges and can be made narrower or wider by suitable adjustment. As shown, a trough 45 is provided to catch excess sprayed metal which is not deposited upon the glass. The trough 45 is connected by a conduit 46 to a suitable exhaust fan mechanism to carry away fumes, gases, etc. Ordinarily, some of the metal spray will tend to adhere to the guard member and such deposit should be removed from time to time.

Figure 10:
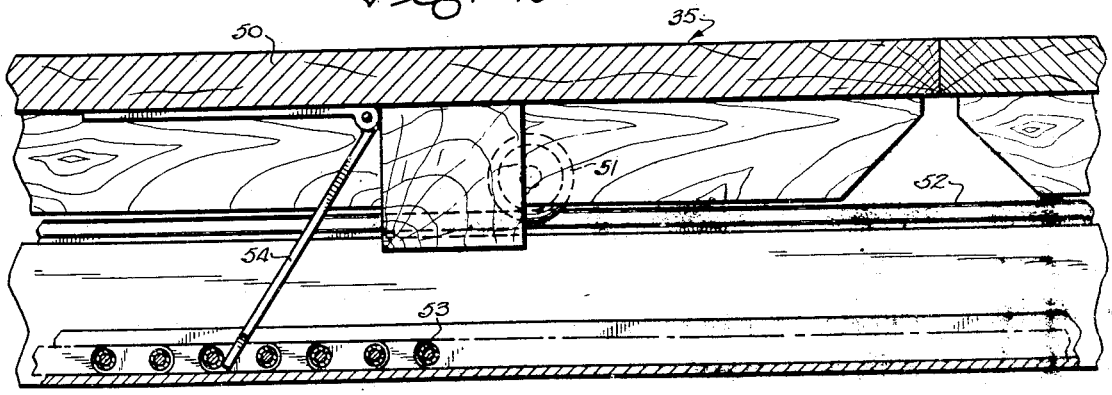
Fig. 10 is a section taken on line 10—10 in Fig. 2.

The guard member 39 and associated parts are shown as mounted on the platform 47 provided with the adjusting mechanism 48 for controlling the vertical adjustment of said guard member, while lateral adjustment thereof is controlled by the adjusting mechanism 49. The conveyor 35 for carrying the glass sheets 34 is more clearly illustrated in Figs. 1 and 2. This conveyor comprises a series of tables or slats 50 which are preferably carried on grooved rollers 51 (Fig. 3) operating on a track 52 and which are propelled forwardly by the chain drive 53. By referring to Fig. 10, it will be seen that each table 50 carries a pivoted latch 54 on its underside which is engaged by the chain drive 53 to advance the tables.

Figure 3:
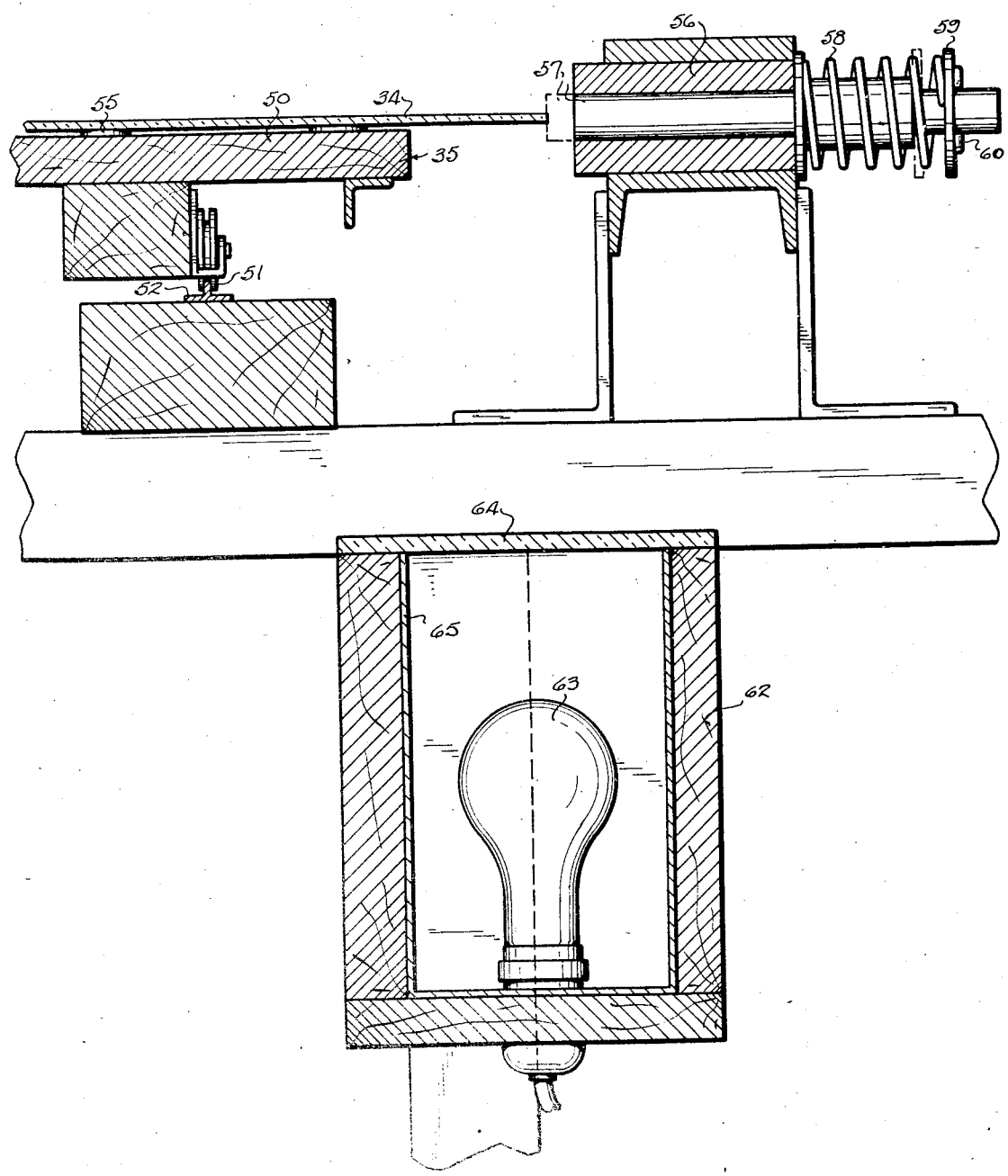
Fig. 3 is an enlarged vertical section taken substantially on the line 3—3 in Fig. 1.

The left hand end of the apparatus shown in Fig. 1 represents the starting end, and it will be noted that each table 50 has spaced buttons 55 of rubber, felt, or other suitable material upon which the glass sheets may rest and be handled without injury thereto. The glass sheets are laid horizontally upon the tables, and as it is important that they be properly positioned, an aligning device is provided. This aligning device consists of an accurately positioned, stationary gauge bar 56 through which extend laterally a series of spring-pressed plungers 57 normally held in retracted position, as shown in Figs. 1 and 3, by springs 58 operating between washers 59 and the gauge bar 56. The washers 59 are retained in position by cotter pins or the like 60. To line up the glass, the sheet 34 is placed close to the gauge bar 56 and a number of the plungers 57 are pushed in to their utmost extent, as indicated in broken lines in Fig. 3, which moves the glass away from the gauge bar a predetermined distance. It is of course important that two or more of the plungers be operated on one piece of glass to insure that it is properly aligned.

To the left of the gauge bar 56, as viewed in Fig. 1, is an inspection area 61, the details of which are given more fully in Fig. 3. Disposed under and along the forward edges of the conveyor tables 50 is a light box 62 having a source of illumination 63 and preferably a cover glass 64 of diffusing material such as ground glass. As a matter of economy, the box 62 is provided with a reflecting surface 65. The glass sheets, therefore, are first moved over the inspection box 62 to make sure that the surfaces thereof to be coated have been thoroughly and properly cleaned. If the glass is not clean enough, it should be removed and recleaned before it is coated with the metal material. After inspection of the glass and proper alignment thereof with the gauge bar and associated parts, the conveyor moves to the right of Fig. 1, continuing through Fig. 2. The next step in the preparation of the glass is to heat the marginal edge portions of the sheets to be coated, and this heating is of vital importance not only in preventing thermal shock of the glass itself, but also to enable a proper bonding of the metal to the glass.

The exact temperature used will vary somewhat with the size and thickness of glass sheets, but in all cases care should be exercised to avoid warpage of the glass and heating should be confined to that area below the critical annealing point of the glass, it being borne in mind that the bond between the glass and the metal improves as the temperature of the glass is increased. Therefore, the temperature of the portions of the glass sheets to be sprayed with metal is preferably as near the critical annealing point of the glass as is practically possible. For ordinary plate and window glass we have found a temperature of approximately 850 degrees Fahrenheit should not be exceeded as detrimental strain might be left in the glass, and in actual practice we have operated within the approximate range of 500 degrees to 600 degrees Fahrenheit. On the other hand, if we were to heat the entire sheets instead of just the edge portions, then the edge portions could be heated higher. For example, if the entire sheet were to be heated to 500 degrees or 600 degrees Fahrenheit, then the edge portions to be sprayed could be heated to about 850 degrees Fahrenheit without much danger of breakage or other troubles, but we prefer to avoid heating the whole sheet, especially in view of our discovery that the edge of the glass can be heated to a relatively high temperature, with satisfactory results, without heating the remainder of the sheet. Heating of the glass in this way prior to spraying of the metal results in an excellent bond between the glass and metal.

Figure 4:
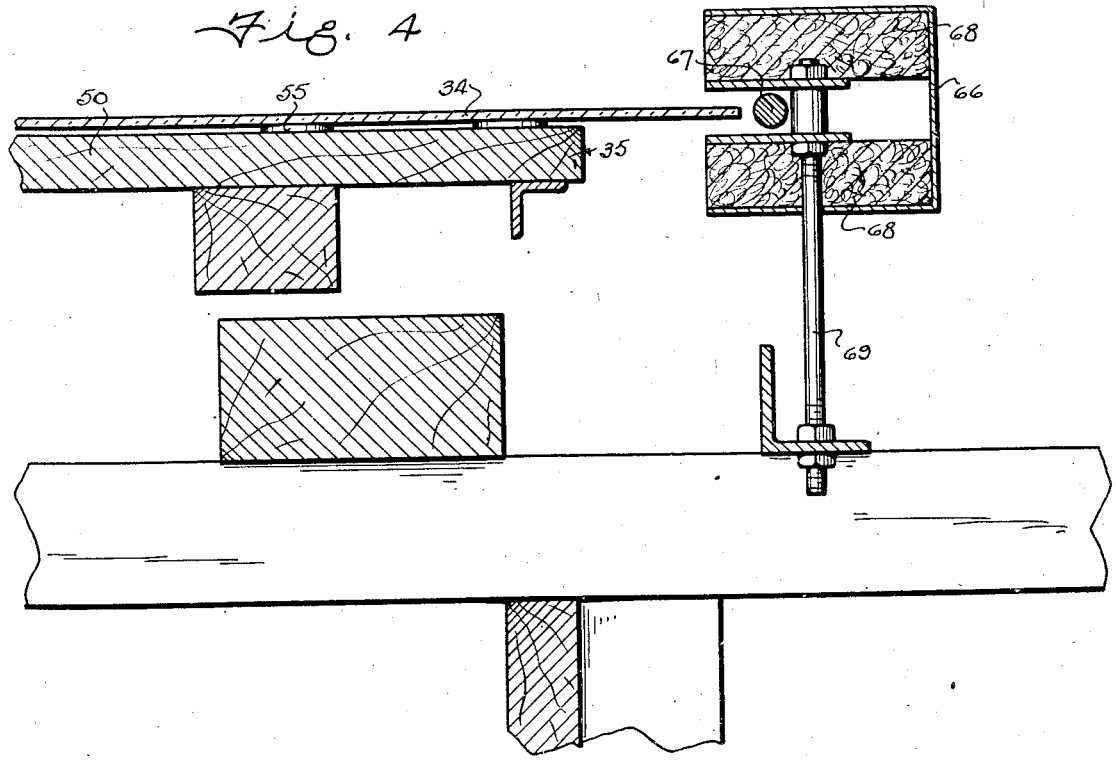
Fig. 4 is another enlarged vertical sectional detail taken on line 4—4 in Fig. 1.
Figure 6:
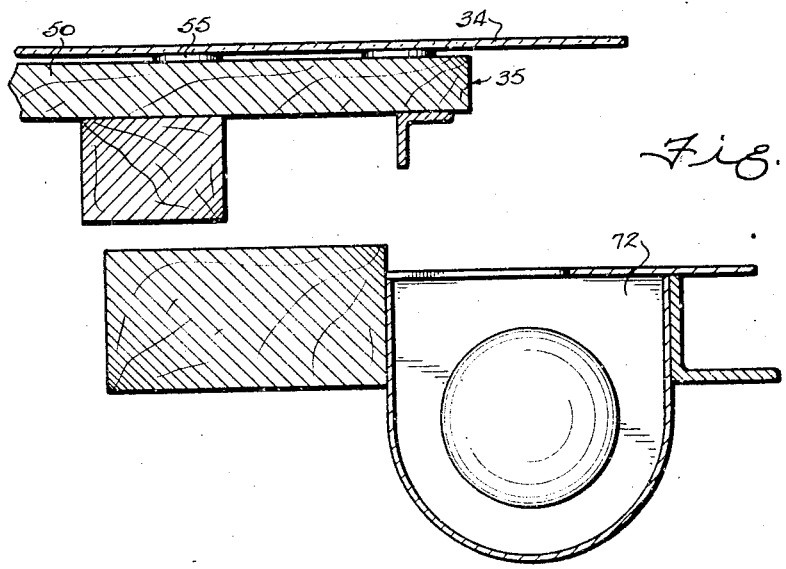
Fig. 6 is a sectional detail taken on line 6—6 in Fig. 2.

As shown in Figs. 1 and 4, the forward edges of the glass sheets 34 which project beyond the conveyor pass through an electrical heating device 66 before reaching the metal spray gun. This heating device comprises an electrical heating element 67 arranged between the upper and lower insulated cover plates 68 carried by supports 69. As best shown in Fig. 4, no part of the heating device actually touches the glass surface to be coated. In lieu of or in addition to the electric heating elements 67, gas burners may be employed and, in any event, we prefer to use gas burners in the vicinity of the metallizing gun, one of which is shown at 70 in Fig. 5. The number of heaters and length of heating zone are dependent naturally upon the speed of the machine and exact operating temperatures desired. We prefer that the heating be done as rapidly as possible and confined to a narrow strip at the edge of the glass. This serves to confine the compressional strain to a narrow band and helps to prevent warping and breaking of the glass. After the glass sheet passes beyond the heating device 66 and just before the metal is sprayed thereon, it is subjected to the action of the burners 70 which heat the surface of the glass to the desired maximum temperature for the reception of the metal spray. The heaters are so controlled that when the glass reaches a position under the gun, it is within the predetermined temperature range desired and the importance of which has already been mentioned.

The conveyor 35 is moved continuously and successive sheets of glass 34 are presented progressively to the spray of metal 37 issuing from the metallizing gun 36.

As shown in Fig. 2, there is arranged to the right of the metal spraying equipment, heaters 71 and the use of these heaters is important because they permit a gradual lowering of the glass temperature to that of the surrounding atmosphere after the metal has been sprayed upon the sheets. This is in effect an annealing of the metallized glass edge portions. As the glass sheets are carried forwardly by the conveyor and leave the annealing heaters 71, the treated edges pass over a second inspection lamp 72. If the metallic coating is satisfactory, the glass is left on the conveyor and will have an appearance similar to that shown in Fig. 7, wherein the glass sheet 34 has a coating on one surface designated by the numeral 73.

Figure 11:
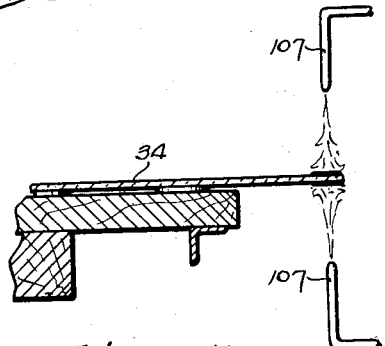
Fig. 11 shows the use of hydrogen flames to remove oxides from the metallic coatings.

We have recently reduced the copper oxides in the coating by the application of a hydrogen flame to the copper surfaces shortly after the coated glass has left the annealing heaters 71. The hydrogen must be burning as a reducing flame and also the glass must not be too hot before it passes under this flame, otherwise reoxidation takes place. It is also desirable that the glass be not completely cooled since the reaction of the hydrogen flame to the copper oxides is more rapid and complete. To this end, there may be arranged above and beneath the path of travel of the glass sheets suitable burners 107 for directing the hydrogen flames upon the glass, as shown in Figs. 2 and 11, as the sheets are carried along by the conveyor and before being subjected to the action of the feather edge producing device 76.

Figure 8:
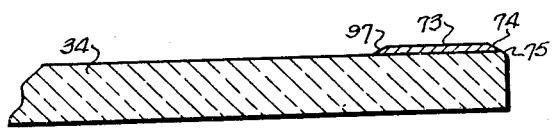
Fig. 8 is a view similar to Fig. 7 after the metallic coating and corner of the glass sheet have been abraded or otherwise treated to produce a feather edge.

An important part of our invention involves the treatment of the metallic coating 73 to taper said coating off to give what we term a feather edge. This is illustrated diagrammatically in Fig. 8 where the metallic coating 73 has been abraded or otherwise treated to miter or bevel the corner or edge 74, and likewise the edge of the glass sheet itself is removed to a slight extent to give the bevel portion 75.

This tapering would in all probability be unnecessary if the sprayed metal and glass possessed the same coefficient of expansion, but they are generally different so that when the glass and metal cool together after the spraying process, the relatively greater contraction of the metal may tend to peel off with an adhering thin layer or coat of glass. We have observed that whenever peeling off occurs, it starts at the weakest spot, namely, the outer edge of the glass, but such tendency to peel off is overcome by tapering the metal coat at the edge, thus reducing its strength in proportion to the thickness removed and in thus lessening the strain in the glass. It will thus be evident that we prefer to feather edge the metal in the manner shown and described, the degree of tapering being controlled to some extent by the variation in coefficient of expansion that exists between the glass and metal used.

Figure 9:
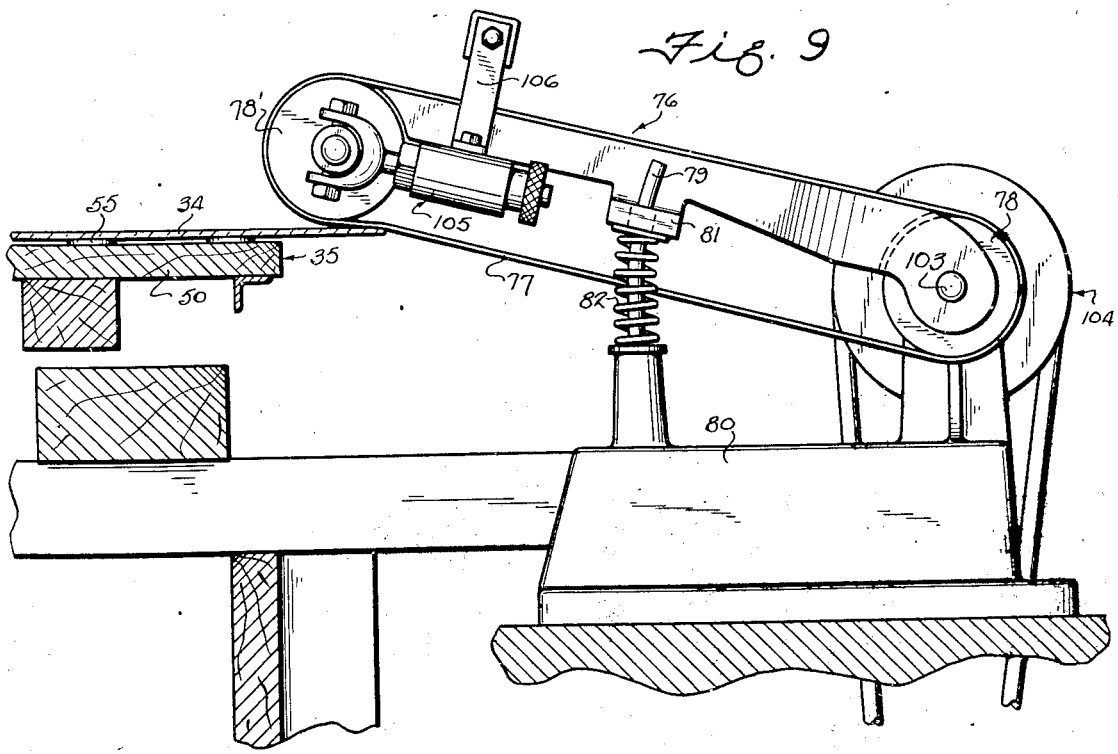
Fig. 9 is an enlarged view of one form of device which can be employed in producing the feather edge shown in Fig. 8, Fig. 9 being taken on line 9—9 in Fig. 2.

A satisfactory device for forming the feather edge on the metallic coating 73 and glass is designated in its entirety by the numeral 76 in Fig. 2 and shown more in detail in Fig. 9. The feather edge producing device 76 comprises an endless abrading belt 77 trained about the spaced rollers 78 and 78'. The belt 77 and associated parts are mounted to pivot on the shaft 103 of roller 78 and which is driven by a suitable drive means 104. The roller 78' is carried by suitable adjusting means 105 adjustable to maintain the proper tensioning of the belt. To attain the desired feathering or mitering of the metallic coating and sheet edge, the abrading belt 77 is mounted at an angle as illustrated in Fig. 9, and the pressure of the abrading belt upon the glass is controlled by the operator who grasps the handle 106 and urges the belt downwardly. A curved guide 79 is carried by the support 80 of the feather edging device and operates through an opening formed in the lip 81. A spring 82 is provided between the lip 81 and support 80 so that the abrading belt is allowed to float gently upon the edge of the glass, with sufficient pressure being applied by the operator to insure abrading of the metallic coating and glass. The degree of miter can be controlled by the angle of inclination of the abrading belt as it works upon the sheet edge and also by the effective pressure of the belt upon the glass.

Figure 7:
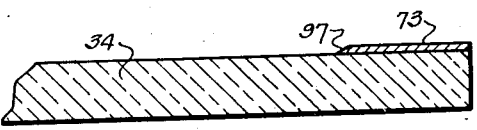
Fig. 7 is a fragmentary vertical transverse section through a sheet of glass showing a metallic coating along the marginal portion of one edge thereof.

The inner edges of the metallized coatings on the glass are likewise feather edged as shown at 97 in Fig. 7. The creation of this feather edge is possible without resorting to abrasion treatment and can easily be handled by proper positioning of the metallizing gun with respect to the glass and guard member 39 illustrated in detail in Fig. 5. As shown in Fig. 5, the gun 36 is mounted on a horizontal shaft 98 and is slidable thereon with respect to the glass being coated. The gun is rotatable about the shaft 98, being held in proper position by the adjusting screw 100. The unit as a whole as well as the shaft 98 are vertically adjustable on the standard 101, being locked in proper position by the locking bolt 102. Care should be used in determining the angularity of the discharge nozzle of the metallizing gun so that the metal deposit 73 formed on the glass will be of substantially uniform thickness and have the tapered or feather edge 97.

It will be understood that by careful selection and preparation of materials as herein described, and by following the procedure suggested, an extremely satisfactory commercial product can be easily made. Certain features should be borne in mind; for example, the differential heating of the glass edge above that of the main body of the glass is important because heating of the glass edge gives an improved bond over cases where the glass is not heated at all, and by confining the heat to the edge instead of heating the entire sheet, manufacturing costs are kept low. Other points are: choice of a suitable material for spraying on the glass to give a permanent bond; freedom from back spray on the glass surfaces adjacent to the coated portion by using the shield to keep a well defined margin of copper deposit on the glass in conjunction with the angle of the metallic spray; and feather edging of the coating.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. In apparatus for metallizing the marginal portions of glass sheets, means for supporting the sheets to be metallized in a substantially horizontal position and for carrying them forwardly, metallizing means mounted above the sheet supporting means for applying a metal spray to the marginal portions of the glass sheets as they are carried therebeneath; a guard member positioned between said sheet supporting means and metallizing means and having an opening therein through which the desired metal spray passes onto the glass sheets and a portion thereof being disposed inwardly of the outer edges of the glass sheets for controlling the width of the metallic coatings applied thereto, and means for rotating said guard member.

2. In apparatus for metallizing the marginal portions of glass sheets, means for supporting the sheets to be metallized in a substantially horizontal position and for carrying them forwardly, metallizing means mounted above the sheet supporting means for applying a metal spray to the marginal portions of the glass sheets as they are carried therebeneath, a guard member comprising an annular ring positioned between said sheet supporting means and metallizing means and having a portion thereof disposed inwardly of the outer edges of the glass sheets for controlling the width of the metallic coatings applied thereto, and means for rotating said annular ring.

3. In apparatus for metallizing the marginal portions of glass sheets, conveyor means for supporting the sheets to be metallized in a substantially horizontal position and for carrying them forwardly, one marginal edge portion of each sheet projecting beyond the side of said conveyor means, metallizing means mounted above the sheet supporting means for applying a metal spray to the projecting marginal portions of the glass sheets as they are carried therebeneath, and means mounted in a fixed position in advance of said metallizing means and engageable by the projecting edges of the glass sheets for aligning said edges of the sheets upon said sheet supporting means prior to being presented to the said metallizing means.

4. In apparatus for metallizing the marginal portions of glass sheets, conveyor means for supporting the sheets to be metallized in a substantially horizontal position and for carrying them forwardly, one marginal edge portion of each sheet projecting beyond the side of said conveyor means, metallizing means mounted above the sheet supporting means for applying a metal spray to the projecting marginal portions of the glass sheets as they are carried therebeneath, a guard member positioned between said sheet supporting means and metallizing means and having a portion thereof disposed inwardly of the projecting edges of the glass sheets for controlling the width of the metallic coatings applied thereto, and means mounted in a fixed position in advance of said metallizing means and engageable by the projecting edges of the glass sheets for aligning said edges of the sheets upon said sheet supporting means prior to being presented to the said metallizing means.

5. In apparatus for metallizing the marginal portions of glass sheets, means for supporting the sheets to be metallized in a substantially horizontal position and for carrying them forwardly, metallizing means mounted above the sheet supporting means for applying a metal spray to the marginal portions of the glass sheets as they are carried therebeneath, a guard member comprising an annular ring positioned between said sheet supporting means and metallizing means and having a portion thereof disposed inwardly of the outer edges of the glass sheets for controlling the width of the metallic coatings applied thereto, said annular ring being substantially V-shaped in cross section, with the thin edge thereof disposed inwardly, and means for rotating the said annular ring.

6. In apparatus for metallizing the marginal portions of glass sheets, means for supporting the sheets to be metallized in a substantially horizontal position and for carrying them forwardly, metallizing means mounted above the sheet supporting means for applying a metal spray to the marginal portions of the glass sheets as they are carried therebeneath, a guard member comprising an annular ring positioned between said sheet supporting means and metallizing means and having a portion thereof disposed inwardly of the outer edges of the glass sheets for controlling the width of the metallic coatings applied thereto, said annular ring being provided with a groove around its outer edge, and means for rotating the said annular ring including a drive belt received within said groove.

7. In apparatus for metallizing the marginal portions of glass sheets, means for supporting the sheets to be metallized in a substantially horizontal position and for carrying them forwardly, metallizing means mounted above the sheet supporting means for applying a metal spray to the marginal portions of the glass sheets as they are carried therebeneath, a guard member comprising an annular ring positioned between said sheet supporting means and metallizing means and having a portion thereof disposed inwardly of the outer edges of the glass sheets for controlling the width of the metallic coatings applied thereto, supporting rollers for the annular ring, guide rollers engaging the inner edge of said ring, and means for rotating the said ring.

8. In apparatus for metallizing the marginal portions of glass sheets, means for supporting the sheets to be metallized in a substantially horizontal position and for carrying them forwardly, metallizing means mounted above the sheet supporting means for applying a metal spray to the marginal portions of the glass sheets as they are carried therebeneath, a guard member comprising an annular ring positioned between said sheet supporting means and metallizing means and having a portion thereof disposed inwardly of the outer edges of the glass sheets for controlling the width of the metallic coatings applied thereto, means for rotating said annular ring, and means for adjusting said annular ring horizontally to control the width of the metallic coatings.

9. In coating apparatus, means for supporting the work to be coated, means for applying a coating material to the work, a guard member comprising an annular ring positioned between the work supporting means and coating means to receive the coating material therethrough and serving to control the width of the coating applied to the work, and means for rotating said annular ring.

10. In coating apparatus, means for supporting the work to be coated, means for applying a coating material to the work, a guard member comprising an annular ring positioned between the work supporting means and coating means to receive the coating material therethrough and serving to control the width of the coating applied to the work, said annular ring being substantially V-shaped in cross section, with the thin edge thereof disposed inwardly, and means for rotating the said annular ring.

11. In coating apparatus, horizontal supporting means for the work to be coated, means mounted above the supporting means for spraying a coating material downwardly upon the work, a guard member comprising a horizontally disposed annular ring positioned between said supporting means and coating means to receive the spray of coating material therethrough and serving to control the width of the coating applied to the work, and means for rotating said annular ring about a vertical axis.

12. In coating apparatus, horizontal supporting means for the work to be coated, means mounted above the supporting means for spraying a coating material downwardly upon the work, a guard member comprising a horizontally disposed annular ring positioned between said supporting means and coating means to receive the spray of coating material therethrough and serving to control the width of the coating applied to the work, said annular ring being substantially V-shaped in cross section, with the thin edge thereof disposed inwardly, and means for rotating said annular ring about a vertical axis.

CHARLES D. HAVEN.
JOHN J. HOPFIELD.